United States Patent [19]

Shirota

[11] Patent Number: 5,160,958
[45] Date of Patent: Nov. 3, 1992

[54] IMAGE PROJECTING APPARATUS

[75] Inventor: Atsushi Shirota, Machida, Japan

[73] Assignee: Minolta Camera Co., Ltd., Osaka, Japan

[21] Appl. No.: 799,736

[22] Filed: Nov. 22, 1991

Related U.S. Application Data

[63] Continuation of Ser. No. 668,581, Mar. 13, 1991, abandoned.

[30] Foreign Application Priority Data

Mar. 14, 1990 [JP] Japan .................................. 2-63394

[51] Int. Cl.$^5$ .......................................... G03B 13/28
[52] U.S. Cl. ........................................ 355/45; 355/43
[58] Field of Search ............................ 355/43, 45, 243

[56] References Cited

U.S. PATENT DOCUMENTS

| | | | |
|---|---|---|---|
| 3,802,773 | 4/1974 | Schneider | 355/43 |
| 4,575,226 | 3/1986 | Zahn et al. | 355/43 |
| 4,591,263 | 5/1986 | Fergg | 355/43 |
| 4,592,649 | 6/1986 | Freitag | 355/43 |
| 4,708,463 | 11/1987 | Kondoh et al. | 355/45 |
| 4,857,965 | 8/1989 | Ishii et al. | 355/45 |
| 4,881,099 | 11/1989 | Onuki et al. | 355/45 |
| 4,885,605 | 12/1989 | Fujita et al. | 355/41 |
| 4,897,687 | 1/1990 | Wise | 355/43 |
| 4,907,873 | 3/1990 | Kuriyama | 353/101 |
| 5,001,513 | 3/1991 | Tokuda | 355/43 |
| 5,016,044 | 5/1991 | Tokuda | 355/43 |

FOREIGN PATENT DOCUMENTS 62-217231 9/1987 Japan .

Primary Examiner—Richard A. Wintercorn
Attorney, Agent, or Firm—Price, Gess & Ubell

[57] ABSTRACT

A reader-printer selectively switchable to a reader mode allowing an image recorded in a microfilm to be projected on a screen and a print mode allowing the image light to be projected on an image-carrying member. This reader-printer is provided with a scanning unit which is selectively movable to a position for projecting the image on the screen and a position for projecting the image on the image-carrying member. This scanning unit in the printer mode causes the image to be projected as rotated 90 degrees on the image-carrying member and allows the image to impinge as though a scanning light on the image-carrying member. As a result, when the image laid widthwise on the screen is printed on the copying paper, this image is projected in a turned posture on the image-carrying member and the copying paper on which the image has been printed is discharged through the front face of the reader-printer.

15 Claims, 6 Drawing Sheets

IMAGE PROJECTING APPARATUS

This is a continuation of application Ser. No. 668,581, filed on Mar. 13, 1991, for an IMAGE PROJECTING APPARATUS now abandoned.

BACKGROUND OF THE INVENTION

1. Field of the Invention

This invention relates to an image projecting apparatus as for the reader-printer which is used for projecting information recorded in a microfilm on a screen and printing the information on a copying paper.

2. Description of the Prior Art

For the purpose of reducing the width of the main body or housing of the reader-printer and, at the same time, improving the operability of the reader-printer, a reader-printer of the so-called front-face paper-discharging type which discharges a printed copying paper through the front face of the housing has been developed (U.S. Pat. No. 4,885,605).

In recent years, there are times when individual image frames are recorded widthwise in the microfilm which is loaded in the reader-printer. In the COM type microfilm, i.e. a microfilm of the type having information recorded therein by the use of a computer, for example, information is often recorded widthwise in each of the frames. When the information recorded in the microfilm of this kind is projected on a screen, it lands on the screen widthwise, namely the longer side of the frame falls horizontally and the shorter side thereof vertically. When the recorded information is to be printed on a copying paper, the reader-printer disclosed in the U.S. patent mentioned above is so adapted that the recorded information is projected on a photosensitive medium as scanned in the vertical direction of the image shown on the screen, namely in the direction along the shorter side of the image frame. The conventional reader-printer, therefore, requires to incorporate in the image forming part thereof with a photosensitive drum possessing a length equaling the longer side mentioned above.

When the reader-printer is adapted to project a given image recorded in a microfilm on a photosensitive medium while scanning that image in the direction along the longer side of the frame of the image for the purpose of printing the image on a copying paper, it is made possible to allot to the length of the photosensitive drum a size equaling the length of the shorter side and not the longer side of the copying paper and consequently reduce the length of the photosensitive drum. For the purpose of this adaptation, however, the recorded information must be turned 90 degrees from the posture allowing the information to be projected on the screen to the posture allowing the information to be projected on the photosensitive drum. Therefore, a rotary drive mechanism incorporating therein a prism has been used in a projecting lens for enabling the image frame to be projected on the photosensitive drum to be turned 90 degrees as described above. The use of the projecting lens which incorporates the rotary drive mechanism of this description therein, however, results in an increase in the cost of the reader-printer.

U.S. Pat. No 4,885,605 mentioned above discloses a reader-printer which is provided with a mirror 28 for scanning a microfilm in the direction along the longer side of an image frame, a mirror 36 for reflecting backwardly the reflected light from the mirror 28, and a mirror 38 adapted to move synchronously with the mirror 28 and reflect the reflected light from the mirror 36 toward a photosensitive material 34.

Incidentally, in this reader-printer, since the two mirrors 28, 38 must be correlatively moved, these mirrors 28, 38 must be positioned with high accuracy. The high accuracy required for the positioning is difficult to attain and certain to entail an increase in the cost of production.

An object of this invention, therefore, is to provide a small image projecting apparatus which is capable of turning an image frame 90 degrees without requiring incorporation of a rotary mechanism in a projecting lens.

Another object of this invention is to provide an image projecting apparatus which allows easy positioning of mirrors and entails no increase in the cost of production.

In accordance with the present invention there is provided, an image projecting apparatus, comprising projecting means for projecting the light through an image recorded in a microfilm on a first surface for receiving the projected light, light path changing means adapted to thrust into the projected light path and alter said light path, reflecting means for causing the image light the path of which has been altered by said light path changing means to be reflected toward a twisted position relative to the path for an incident light toward said light path changing means and made to impinge on a second surface for receiving said ident light, and moving means for selectively moving said light path changing means to a position allowing said light path changing means to thrust into the light path of said projecting means and a position allowing said light path changing means to retract from said light path of said projecting means.

DESCRIPTION OF THE PREFERRED EMBODIMENTS

Now, this invention will be described in detail below with reference to the illustrated embodiment.

Figure 1:
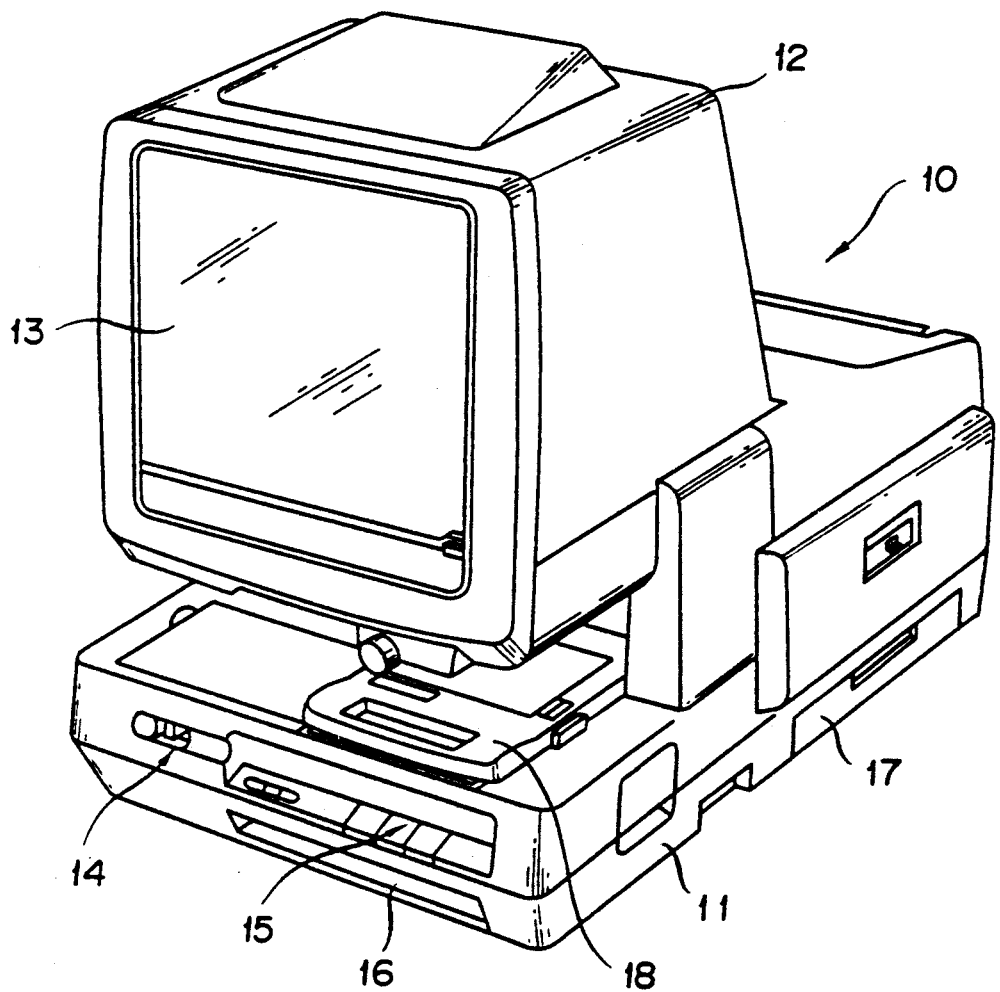
FIG. 1 is a perspective view of a reader-printer as one embodiment of this invention.

As illustrated in FIG. 1, a reader-printer 10 is provided with a basal part 11 and a screen case part 12 formed integrally on the basal part 11. A screen 13 is attached to the front face of the case part 12. The basal part 11 and the screen part 12 mentioned above form a main body or housing of the apparatus. A main switch 14 and an operating panel 15 are disposed opposite the front face of the basal part 11. A paper outlet 16 for discharging printed copying papers is formed on the lower side of the operating panel 15. A feed paper cassette 17 packed with copying papers is detachably inserted into the rear portion of the basal part 11 through the lateral face thereof. A film carrier or a film-retaining part 18 is disposed on the upper face of the front end portion of the basal part 11. A microfilm loaded in the film-retaining part 18 is moved to a desired position in the horizontal direction in order for a desired image frame out of a multiplicity of image frames contained in the microfilm to be set at a pertinent position in the path of a projected light.

Figure 2:
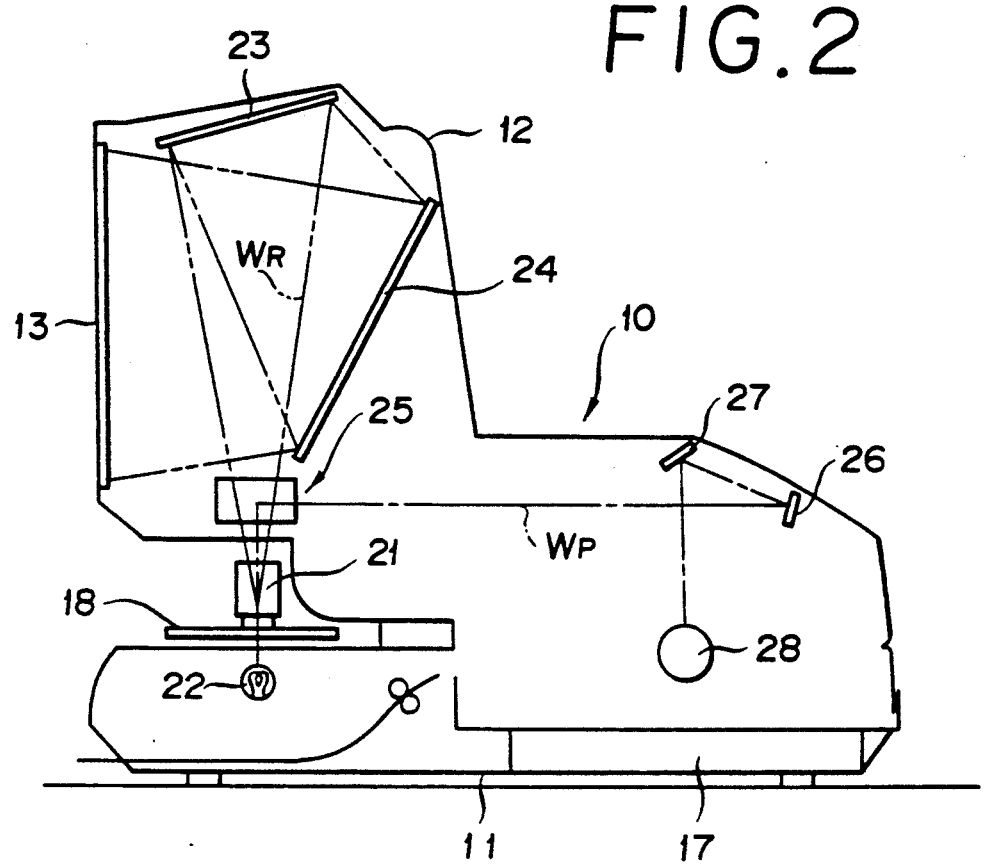
FIG. 2 is a cross section taken laterally to show the inner construction of the reader-printer shown in FIG. 1.

FIG. 2 illustrates the inner construction of the reader-printer 10. A projecting lens 21 is attached to the lower portion of the screen ease 12. This projecting lens 21 is disposed above the film-retaining part 18.

Figure 3:
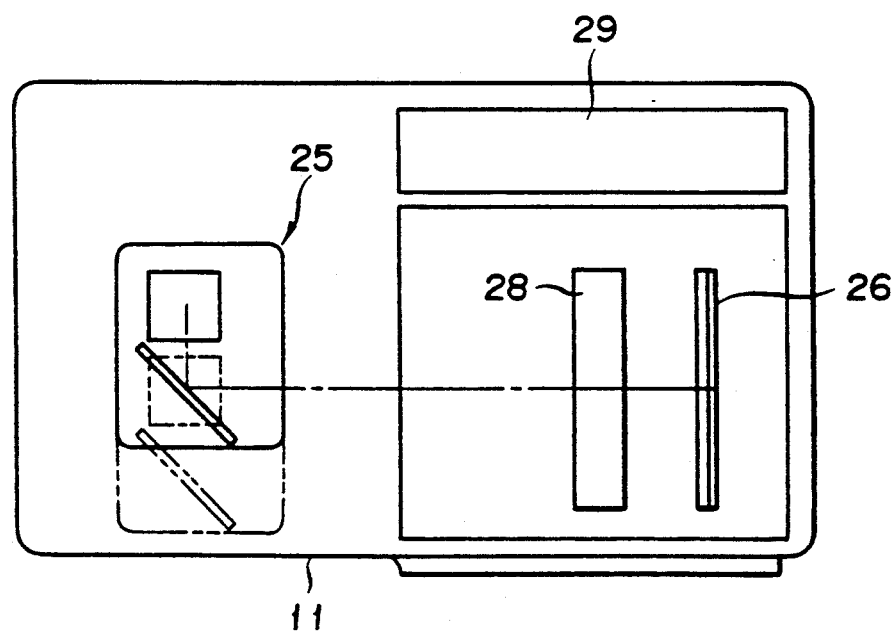
FIG. 3 is a cross section taken horizontally through the reader-printer shown in FIG. 2.

During the reader mode, the light from a light source 22 reaches the screen 13 through the medium of mirrors 23, 24 and causes an image recorded in the microfilm to be magnified by the projecting lens 21 and projected on the screen 13. During the print mode, the light from the light source is advanced through the medium of an image scanning unit 25 and mirrors 26, 27 and caused to impinge on a photosensitive drum 28 disposed inside the rear portion of the basal part 11. Well-known unshown component members of an image forming device are disposed around the photosensitive drum 28. In FIG. 2, the symbol WR stands for a reader light path and the symbol WP for a print light path. In FIG. 3, the reference numeral 29 stands for a power source unit. To switch the reader light path WR to the print light path WP and vice versa, the image scanning unit 25 is movably seated at the position above the projecting lens 21 inside the screen case 12. In FIG. 3, the solid line indicates the state in which the image scanning unit 25 is set at the operating position and the two-dot chain line the state in which the image scanning unit 25 is set at the retracting position to be assumed in consequence of retraction from the operating position. At the operating position, the image scanning unit 25 enters the position occupied by the light which has passed through the projecting lens 21 to form the print light path WP mentioned above. In the retracting position, the image scanning unit 25 forms the reader light path WR.

Figure 4:
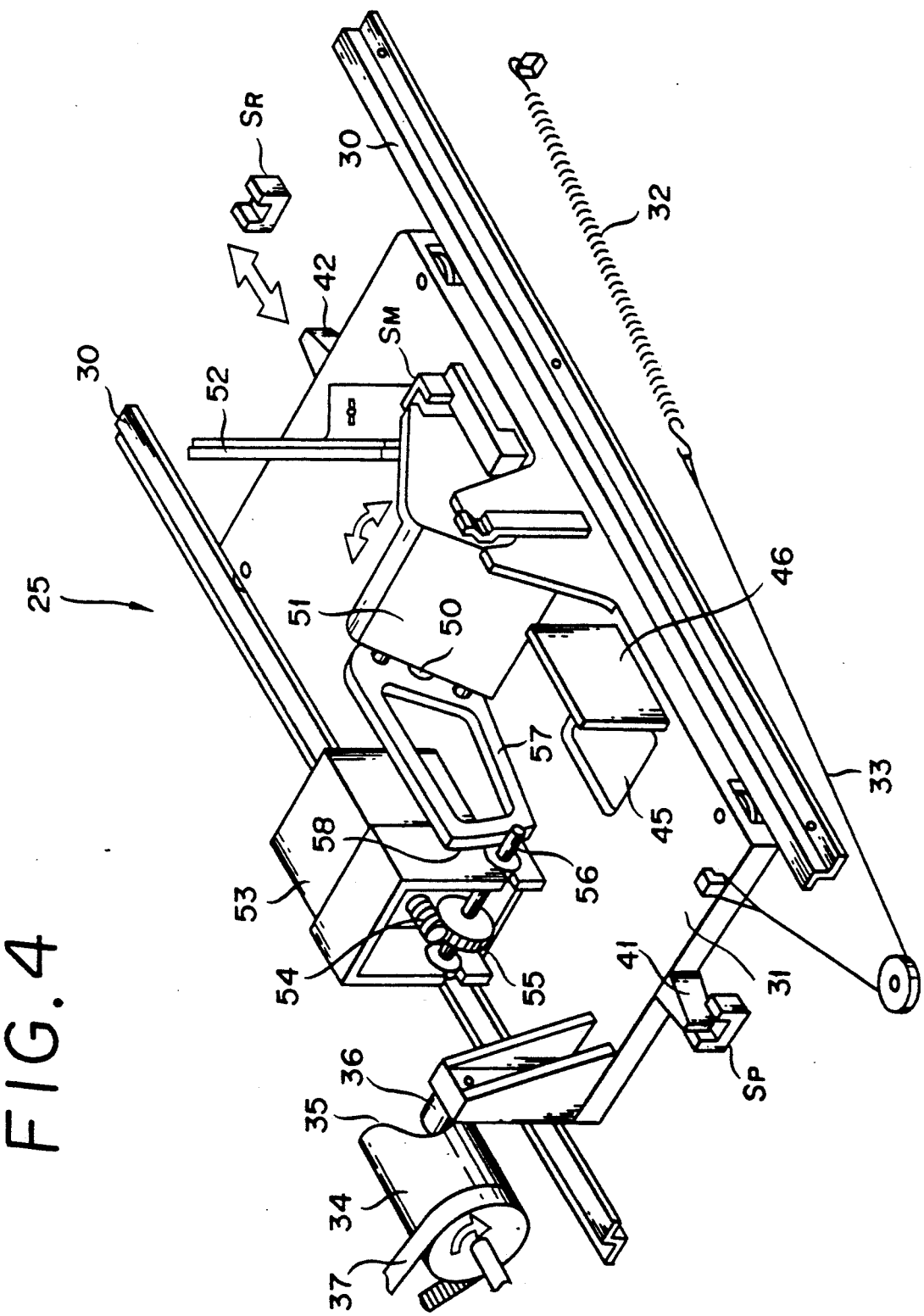
FIG. 4 is a perspective view illustrating an image scanning unit disposed inside the reader-printer.

The image scanning unit 25 is illustrated in detail in FIG. 4. As illustrated in the diagram, two guide rails 30 are fixed inside the main body of the apparatus and a moving base 31 is freely reciprocated along these guide rails 30. FIG. 4 illustrates the state in which the image scanning unit 25 is set at the aforementioned operating position namely the print position. To impart to the moving base 31 a resilient force urging the moving base 31 in the direction of the operating position mentioned above, a tensile coil spring 32 is fastened through the medium of a wire 33 to the moving base 31. For the purpose of reciprocating the moving base 31 between the operating position and the retracting position mentioned above, a substantially cylindrical cubic cam 34 is rotatably attached to the main body of the apparatus. On the right end face of this cubic cam 34 illustrated in FIG. 4, a cam face 35 whose amount of projection toward the right gradually increases along the diametric direction is formed. A roller 36 attached to the moving base 31 is allowed to contact the cam face 35. The cubic cam 34 is driven by a motor not shown in the diagram through the medium of a belt 37 and a Clutch 62. The means for moving the moving base 31 is not limited to the cubic cam 34. A suitable means capable of imparting the motion under discussion to the moving base 31 may be employed similarly effectively instead.

To detect the fact that the moving base 31 has assumed the operating position or printing position, a printing position detecting sensor SP which is actuated by a dog 41 disposed at the left end portion of the moving base 31 in the bearings of FIG. 4 is provided in the main body of the apparatus. To detect the fact that the moving base 31 has assumed the retracting position or reader position, a reader position detecting sensor SR which is actuated by a dog 42 disposed in the right end portion of the moving base 31 is provided for the main body of the apparatus.

In the moving base 31 is formed a through hole 45. When the moving base 31 has assumed the retracting position, the light which has passed through the projecting lens 31 passes through this through hole 45 and reaches the screen 13. To prevent the light which has advanced past the through hole 45 from being randomly scattered by the lateral surface of the through hole 45, a light-shielding plate 46 is set upright from the moving base 31. This lightshielding plate 46 serves the purpose of preventing a harmful light generated by random reflection from impinging on the screen 13.

To the moving base 31, a scanning reflecting mirror 51 is attached shakably around a shaft 50 which is laid in the longitudinal direction of the main body of the apparatus. The light which has passed through the projecting lens 21, therefore, is reflected in the direction of width of the main body of the apparatus. To the position thus reached by the reflected light is attached a stationary reflecting mirror 52 slanted by 45 degrees relative to the aforementioned shaft 50, the stationary reflecting mirror 52 reflects the light from a scanning reflecting mirror 51 in the direction of the photosensitive drum 28. To shake the scanning reflecting mirror 51, a worm gear 54 attached to the main shaft of a scanning motor 53 is meshed with a worm wheel 55 and a drive shaft 56 is integrally formed with the worm wheel 55. Though the present embodiment is depicted as using a stepping motor for the scanning motor 53, some other motor than the stepping motor may be used similarly effectively instead. The drive shaft 56 is held in fast contact with an arcuate surface 58 of a shaking arm 57 formed integrally with the scanning reflecting mirror 51. To the side of the reflecting mirror 51 to which the shaking arm 57 is not attached, a detecting arm 65 is integrally attached. The initial position or shake-starting position of the scanning reflecting mirror 51 is detected by the fact that the mirror position detecting sensor SM detects the detecting arm 65. The sensors SP, SR, and SM mentioned above are severally formed of a limit switch or a microswitch, for example.

Figure 5:
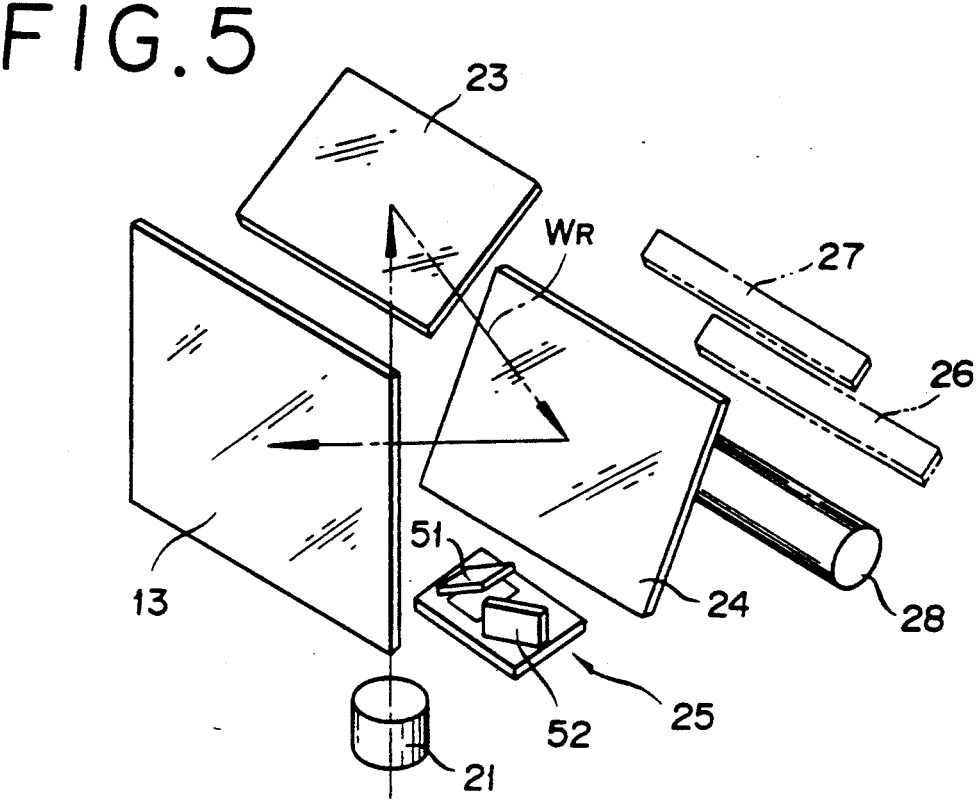
FIG. 5 is a perspective view illustrating the image scanning unit posed at the position for the reader mode.

For the purpose of projecting an image information recorded in a microfilm on the screen by the use of the reader-printer mentioned above, the reader-printer is set into the reader mode by means of a relevant switch installed on the operating panel 15. In this mode, the moving base 31 assumes the position at the righthand end in the bearings of FIG. 4 and the through hole 45 assumes the position directly above the projecting lens 21 to give rise to the reader light path WR shown in FIG. 2. When the information recorded in the microfilm consists of image frames having their longer sides laid in the direction of width of the main body of the apparatus, for example, an image from this microfilm is projected with magnification on the screen 13 widthwise, namely in the posture having the longer side thereof laid in the horizontal direction. At this time, the light path WR assumes the posture as illustrated in FIG. 5.

Figure 6:
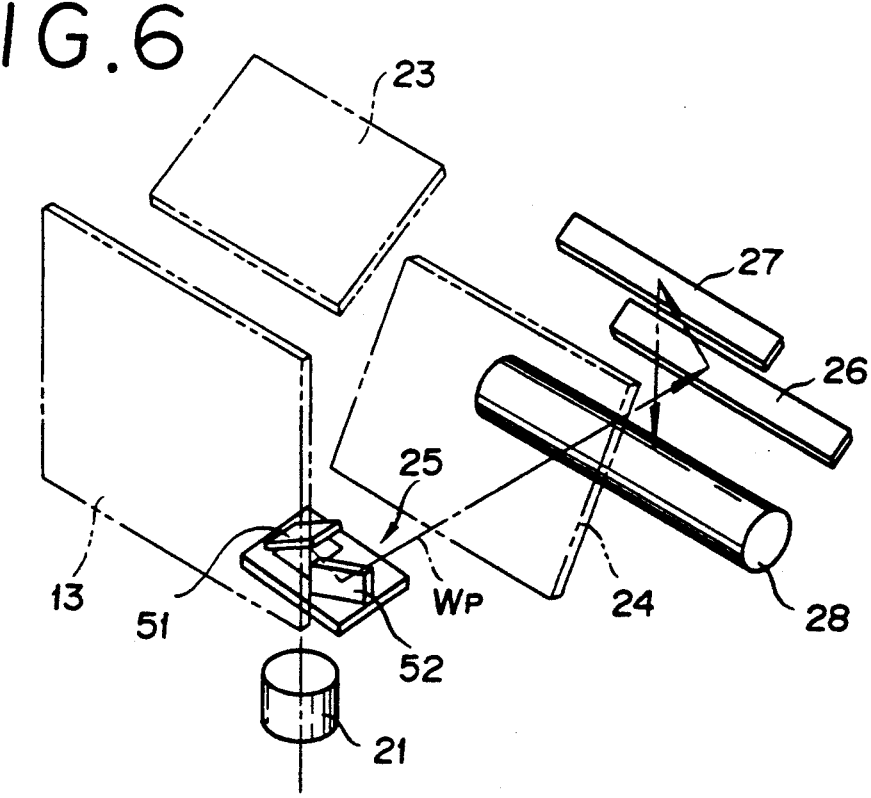
FIG. 6 is a perspective view illustrating the image scanning unit posed at the position for the print mode.

For the purpose of printing an image from the microfilm on a copying paper, the moving base 31 is moved by the rotation of the cubic cam 34 to the position shown in FIG. 4. As a result, the light which has passed through the projecting lens 21 is made to impinge on the photosensitive drum 28 through the medium of the scanning reflecting mirror 51, the stationary reflecting mirror 52, and the mirrors 26, 27. At this time, the image scanning unit 25 occupies the position and the printer light path WP assumes the posture shown on FIG. 6. In this state, the recorded image impinges as though a scanning light on the photosensitive drum 28 because the scanning reflecting mirror 51 shakes synchronously with the peripheral speed of the photosensitive drum 28. When the recorded images are contained in image frames which are laid widthwise as described above, for example, a slit of light equaling the vertical length of the screen 13 is made to scan the photosensitive drum 28 in the direction along the longer side of an image.

Figure 7:
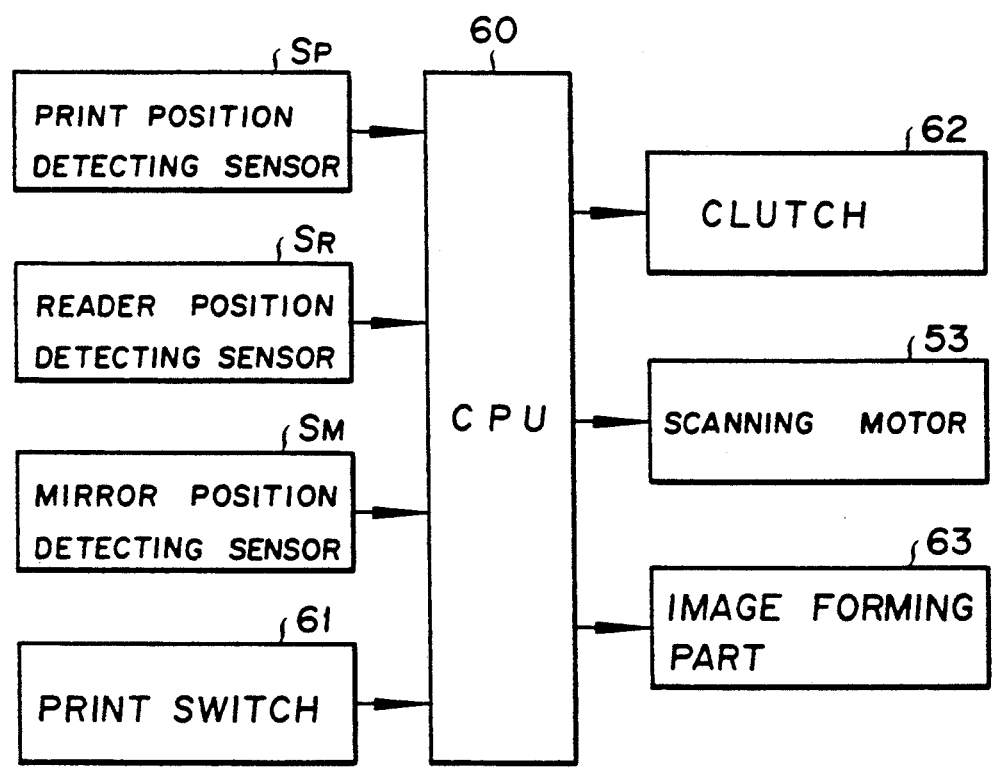
FIG. 7 is a block diagram illustrating a control circuit for the reader-printer.

FIG. 7 is a diagram illustrating a control circuit of the reader-printer. To a CPU 60, the signal from a print switch 61 and the signals from the sensors SP, SR, and SM are delivered. For the purpose of driving the cubic cam 34 in accordance with these input signals, the CPU 63 issues a control signal to the clutch 62 adapted to transmit the motion of a main motor to the cubic cam 34, the scanning motor 53, and a member forming the image forming part 3 inclusive of the photosensitive drum 28.

Figure 8:
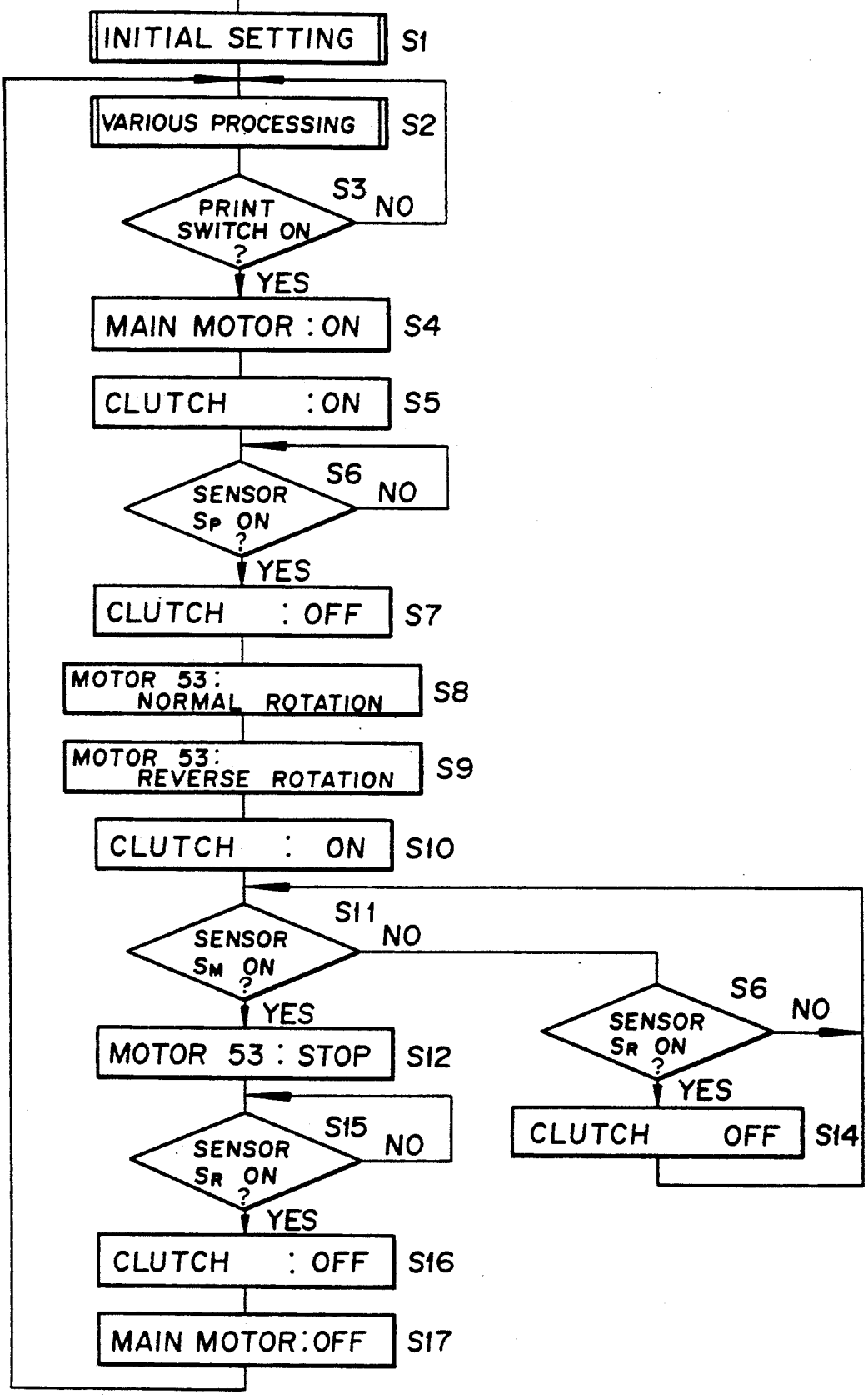
FIG. 8 is a flow chart illustrating a printing motion for printing a recorded image on a copying paper.

Now, the operation of the reader-printer for printing an image from a microfilm on a copying paper will be described below with reference to a flow chart illustrated in FIG. 8.

When the power source for the reader-printer is turned on, the apparatus is reset at Step S1 and various processings necessary for the printing operation are executed at Step S2. In the ensuant state, the image scanning unit 25 occupies the retracting position, namely the position indicated by a two-dot chain line in FIG. 3. When the fact that the print switch 61 is consequently turned on is discerned at Step S4, the main motor in the reader-printer is set into motion at Step S4 and, for the purpose of effecting transmission of this motion of the main motor to the cubic cam 34, the clutch 62 is turned on at Step S5. When the cubic cam 34 is set into rotation and the image scanning unit 25 is moved to the operating position as indicated in FIG. 4 as a result, the print position-detecting sensor SP is turned on at Step S6 and the clutch 62 is turned off at Step S7.

Then, at Step S8, the scanning motor 53 is rotationally driven proportionately to a prescribed number of pulses and the scanning reflecting mirror 51 is set into shaking motion. As a result, the scanning light is made to impinge on the photosensitive drum 28 and, at the same time, the photosensitive drum 28 is rotated as synchronized with the shaking motion of the scanning reflecting mirror 51, to print an image on a copying paper. After the scanning is completed, the scanning motor 53 is set into reverse rotation and the scanning reflecting mirror 51 is returned to the home position at Step S9 and, at the same time, a cam-rotating clutch is set into motion and the image scan unit 25 is moved in the direction of the retracting position at Step S10.

When the fact that the scanning mirror 51 has returned to the home position is detected by the mirror position-detecting sensor SM at Step S11, the reverse rotation of the scanning motor 53 is stopped at Step S12. When the fact that the reader position-detecting sensor SR is turned on is detected at Step S15, the clutch 62 is turned off and the motion of the image scanning unit 25 is stopped at Step S16.

Conversely, when the reader position-detecting sensor SR is turned on at Step S13 before the mirror position-detecting sensor SM is turned on at Step S11, the clutch 62 for driving the cam is turned off at Step S14 and the rotation of the scanning motor 53 is stopped at Step S12. Then, after the main motor is stopped, the apparatus is kept waiting for the print switch to be subsequently turned on at Step S17.

It is permissible to use such reflecting members as prisms in the place of the scanning reflecting mirror 51 and the stationary mirror 52 in the illustrated reader printer. In the illustrated embodiment, the image scanning unit 25 is depicted as adapted to be reciprocated in the lateral direction of the main body of the apparatus. Optionally, it may be adapted to be reciprocated in the longitudinal direction instead. Though the stationary reflecting mirror 52 is depicted in the illustrated embodiment as fixed on the image scanning unit 25, it may be fixed inside the main body of the apparatus instead. Particularly when the stationary reflecting mirror 52 is fixed inside the main body of the apparatus, it is desirable that the retracting position of the image scanning unit 25 should fall in the direction opposite to that illustrated in the diagram or it should be adapted to be reciprocated in the longitudinal direction instead.

Further, the foregoing embodiment has been depicted as a reader-printer of the type projecting an image in the goes without saying that this invention can be applied to an image projecting apparatus of the type projecting an image in a microfilm on a light-receiving element such as, for example, CCD.

While this invention has been illustrated and described in accordance with a preferred embodiment, it is recognized that variations and changes may be made and equivalents employed herein without departing from the invention as set forth in the claims.

I claim:

1. An image projecting apparatus capable of selectively projecting light through an image in a microfilm onto a screen and onto an image-carrying member, comprising:
   conveying means for conveying copying paper to the image-carrying member;
   projecting means for projecting the image light onto the screen;
   a scanning mirror, capable of being shakably moved around an axis parallel to the direction in which said conveying means conveys a copying paper, for scanning the image for reflection in a direction perpendicularly intersecting the direction of conveyance by thrusting the scanning mirror into the light path;
   a reflecting mirror for reflecting the image light reflected by said scanning mirror on the image-carrying member; and
   moving means for selectively moving said scanning mirror to a first position allowing said scanning mirror to be thrust into the light path of said projecting means and a second position allowing said scanning mirror to retract from said light path of said projecting means.

2. An image projecting apparatus according to claim 1, wherein said conveying means conveys the copying paper in the deep direction of said apparatus.

3. An image projecting apparatus according to claim 1, wherein the axis intersects said screen substantially perpendicularly.

4. An image projecting apparatus according to claim 1, wherein said reflecting mirror is slanted by 45 degrees relative to the axis.

5. An image projecting apparatus according to claim 1, further comprising a retaining member for integrally holding said scanning mirror and said reflecting mirror, said retaining member being moved by said moving means.

6. An image projecting apparatus according to claim 5, further comprising an opening formed in said retaining member in such a manner that said image light penetrates said opening when said scanning mirror is set in the first position, and a light shielding member disposed in the peripheral part of said opening and for intercepting the light randomly reflected by the peripheral part.

7. A reader-printer apparatus selectively switchable to a first mode for allowing light passing through an image on a microfilm to be projected to an image-carrying member and to a second mode allowing said light to be projected onto a screen, comprising:
a projecting lens for magnifying and projecting the light through an image in a microfilm;
conveying means for conveying a copying paper from one part of said apparatus to another part of said apparatus;
an image scanning unit movable disposed between a first position out of a light path through said projecting lens and a second position in the light path; and
reflecting means disposed on said image scanning unit and rotatably around an axis parallel to the direction in which said conveying means conveys said copying paper and adapted to reflect the light through said projecting lens in the direction of conveyance, wherein said image scanning unit is positioned at the first position during the first mode and at the second position during the second mode.

8. An image projecting apparatus capable of selectively projecting the light through an image in a microfilm on a first and a second surface for receiving the projected light image, comprising:
projecting means for projecting said image light on said first surface;
an image scanning unit provided with a plurality of reflecting members and adapted to thrust into the light path of said projecting means and reflect said image light toward said second surface; and
means for setting said image scanning unit into a motion.

9. An image projecting apparatus according to claim 8, wherein said first surface is a screen and said second surface is an image-carrying member.

10. An image projecting device according to claim 8, wherein said drive means comprises guide rails for guiding the motion of said image scanning unit, a cam having a cam surface facing the direction in which said image scanning unit moves, a spring for urging said image scanning unit toward said cam surface, and a drive motor for driving said cam.

11. A reader-printer selectively switchable to a first mode allowing the light through an image in a microfilm to be projected on an image-carrying member and to a second mode allowing said image light to be projected on a screen, comprising:
conveying means for conveying a copying paper in the direction of said image-carrying member:
reflecting means disposed shakably around an axis parallel to the direction in which said copying paper is conveyed and adapted to reflect said image light in a direction perpendicular to the direction of said conveyance; and
drive means for moving said reflecting means between a position allowing said reflecting means to thrust into the light path of said image light and a position allowing said reflecting means to retract from said light path of said image light.

12. A reader-printer according to claim 11, wherein said reflecting means is set at the position allowing said reflecting means to thrust into the light path during said first mode and at the position allowing said reflecting means to retract during said second mode.

13. A reader-printer according to claim 11, wherein said conveying means conveys said copying paper in the longitudinal direction of the main body of said apparatus.

14. A reader-printer selectively switchable to a print mode allowing light through an image in a microfilm to be projected on an image-carrying member and a reader mode allowing said image light to be projected on a screen; comprising;
conveying means for conveying a copying paper in the direction of said image-carrying member;
first reflecting means disposed rotatably around an axis parallel to the direction of conveyance of said copying paper and adapted to reflect said image light in a direction perpendicular to said direction of conveyance:
second reflecting means for reflecting the reflected light from said first reflecting means in the direction of said image-carrying member: and
moving means for causing said first reflecting means to thrust into the light path of said image light during said print mode and causing said first reflecting means to retract from the light path of said light image during said reader mode.

15. A reader-printer according to claim 14, further comprising a retaining member for integrally retaining said first and second reflecting members, said retaining members being moved by said moving means.

* * * * *